United States Patent

Lynam et al.

Patent Number: 5,808,777
Date of Patent: Sep. 15, 1998

[54] ELECTROCHROMIC MIRROR FOR VEHICLES

[75] Inventors: Niall R. Lynam; Desmond J. O'Farrell, both of Holland; Kenneth L. Schierbeek, Zeeland; Michael A. Hansen, West Olive, all of Mich.

[73] Assignee: Donnelly Corporation, Holland, Mich.

[21] Appl. No.: 810,020

[22] Filed: Mar. 3, 1997

Related U.S. Application Data

[63] Continuation of Ser. No. 442,956, May 17, 1995, Pat. No. 5,610,756, which is a continuation of Ser. No. 971,676, Nov. 4, 1992, Pat. No. 5,446,576, which is a continuation of Ser. No. 643,186, Jan. 18, 1991, abandoned, which is a continuation-in-part of Ser. No. 618,169, Nov. 26, 1990, Pat. No. 5,151,824.

[51] Int. Cl.$^6$ .................................................. G02F 1/15
[52] U.S. Cl. ............................................ 359/265; 359/267
[58] Field of Search ...................................... 359/265, 267

[56] References Cited

U.S. PATENT DOCUMENTS

| | | | |
|---|---|---|---|
| 3,686,473 | 8/1972 | Shirn et al. | 219/219 |
| 3,790,748 | 2/1974 | Van Laethem et al. | 219/219 |
| 3,840,292 | 10/1974 | Griffin et al. | 350/278 |
| 3,862,798 | 1/1975 | Hopkins | 350/228 |
| 3,934,111 | 1/1976 | Roselli et al. | 219/203 |
| 3,940,822 | 3/1976 | Emerick et al. | 15/250.22 |
| 4,005,928 | 2/1977 | Kmetz et al. | 350/160 |
| 4,117,475 | 9/1978 | Ebihara et al. | 340/336 |
| 4,119,842 | 10/1978 | Hayden et al. | 250/201 |
| 4,161,653 | 7/1979 | Bedini et al. | 250/215 |
| 4,200,361 | 4/1980 | Malvano et al. | 350/336 |
| 4,201,451 | 5/1980 | Jacob | 350/228 |
| 4,251,316 | 2/1981 | Smallbone | 156/634 |
| 4,299,444 | 11/1981 | Römer | 350/228 |
| 4,309,082 | 1/1982 | Kohara et al. | 350/357 |
| 4,410,790 | 10/1983 | Berg et al. | 219/219 |
| 4,475,031 | 10/1984 | Mockovciak, Jr. | 250/212 |
| 4,512,637 | 4/1985 | Ballmer | 350/357 |
| 4,527,047 | 7/1985 | Seitz | 219/219 |
| 4,529,275 | 7/1985 | Ballmer | 350/357 |
| 4,529,873 | 7/1985 | Ballmer et al. | 350/357 |

(List continued on next page.)

FOREIGN PATENT DOCUMENTS

| | | |
|---|---|---|
| 54-112490 | 3/1981 | Japan . |
| 57-173801 | 10/1982 | Japan . |
| 60-121141 | 6/1985 | Japan . |
| 60-139545 | 7/1985 | Japan . |
| 60-174342 | 9/1985 | Japan . |
| 61-59317 | 3/1986 | Japan . |
| 59-141215 | 4/1986 | Japan . |
| 61-54942 | 4/1986 | Japan . |

OTHER PUBLICATIONS

Ushakov et al., "Electrochromism of Organic Compounds: Some Properties of Two–electrode Cells," Schientific–Research Institute of Organic Intermediates and Dyes, Moscow, 1978.

*Primary Examiner*—Georgia Y. Epps
*Assistant Examiner*—Dawn-Marie Bey
*Attorney, Agent, or Firm*—Van Dyke, Gardner, Linn & Burkhart, LLP

[57] ABSTRACT

A rearview mirror system for a vehicle having an electrochromic reflective element and heating means for uniformly heating substantially the entire reflectance surface in order to promote uniform coloration of the reflectance surface to a desired reflectance level. The reflective element is illustrated as an all solid-state electrochromic element having a large area reflectance surface for use as the exterior mirrors of a truck or other large vehicle. The application of energy to the heater can be controlled on the basis of a low ambient light condition and an ambient temperature that is low but not necessarily freezing, such as between 5° C. and 20° C. The heater can be resistance film that is evenly covering a surface of the reflective element and divided into first and second regions by an insulating break in the resistance film. Energy may be applied to one region in order to heat the reflectance element at a high rate to remove frost and dew. Energy may be applied to both regions in order to apply heat at a lower rate for even coloration of the mirror.

16 Claims, 5 Drawing Sheets

U.S. PATENT DOCUMENTS

| | | | |
|---|---|---|---|
| 4,572,619 | 2/1986 | Reininger et al. | 359/329 |
| 4,580,875 | 4/1986 | Bechtel et al. | 350/278 |
| 4,584,461 | 4/1986 | Teshima et al. | 219/209 |
| 4,603,946 | 8/1986 | Kato et al. | 356/331 |
| 4,623,222 | 11/1986 | Itoh et al. | 350/331 |
| 4,632,509 | 12/1986 | Ohmi et al. | 350/283 |
| 4,634,835 | 1/1987 | Suzuki | 219/219 |
| 4,655,549 | 4/1987 | Suzuki et al. | 350/331 |
| 4,669,825 | 6/1987 | Itoh et al. | 350/332 |
| 4,676,601 | 6/1987 | Itoh et al. | 350/331 |
| 4,690,508 | 9/1987 | Jacob | 350/331 |
| 4,697,883 | 10/1987 | Suzuki et al. | 350/331 |
| 4,701,022 | 10/1987 | Jacob | 350/278 |
| 4,712,879 | 12/1987 | Lynam et al. | 350/357 |
| 4,715,698 | 12/1987 | Haba | 350/588 |
| 4,721,364 | 1/1988 | Itoh et al. | 350/332 |
| 4,741,603 | 5/1988 | Miyagi et al. | 350/357 |
| 4,793,690 | 12/1988 | Gahan et al. | 350/279 |
| 4,882,466 | 11/1989 | Friel | 219/219 |
| 4,896,030 | 1/1990 | Miyaji et al. | 250/201 |
| 4,917,477 | 4/1990 | Bechtel et al. | 350/357 |
| 4,987,289 | 1/1991 | Bishop et al. | 219/209 |
| 5,130,842 | 7/1992 | Gauthier et al. | 359/265 |
| 5,151,824 | 9/1992 | O'Farrell | 359/603 | ns
ELECTROCHROMIC MIRROR FOR VEHICLES

This is a continuation of application Ser. No. 08/442,956, filed May 17, 1995, now U.S. Pat. No. 5,610,756, which is a continuation of application Ser. No. 07/971,676, filed Nov. 4, 1992, now U.S. Pat. No. 5,446,576, which is a continuation of application Ser. No. 07/643,186, filed Jan. 18, 1991, abandoned, which is a continuation-in-part of application Ser. No. 07/618,169, filed Nov. 26, 1990, now U.S. Pat. No. 5,151,824.

BACKGROUND OF THE INVENTION

This invention relates generally to vehicle rearview mirror systems and more particularly to mirror systems utilizing electrochromic reflective elements. The invention is especially adapted to externally located rearview mirrors utilizing an all solid-state electrochromic reflective element, having a continuously variable reflectance surface.

Use of auxiliary heaters to serve as defrosting means for exterior vehicle rearview mirrors is well known in the art. However, their purpose is merely to melt ice or evaporate moisture on the mirror surface, and particularly that built up while the vehicle was parked. Thus, prior art heaters for mirrors are intended to heat the mirror to at least 0° C. in as rapid a time as possible. Because the de-icing process is aided by already melted run-off water that tends to assist de-icing of peripheral areas, and because the center region of the mirror is the most utilized area, auxiliary heating means intended for defrosting purposes are more concerned with a rapid heating of the exposed front surface of the mirror, particularly its central region, rather than a uniform distribution of heat across the reflective element.

Although heating pads and resistance films can be designed to provide uniform power distribution suitable for de-icing purposes over the front surface of the mirror, commercially available products built according to the teachings of the prior art do not heat the reflective element in a truly uniform manner. However, because of the necessity for producing large quantities of heat as opposed to an even distribution, such prior art devices have proven satisfactory for the de-icing function.

Electronically dimming vehicle rearview mirror systems tend to utilize either liquid crystal or electrochromic reflective elements. Electrochromic reflective elements are further divided into all solid-state elements, such as disclosed in U.S. Pat. No. 4,712,879 issued to Niall R. Lynam for ELECTROCHROMIC MIRROR, and electrochemichromic elements such as disclosed in co-pending commonly assigned U.S. Pat. No. 5,140,455 for HIGH PERFORMANCE ELECTROCHEMICHROMIC SOLUTIONS AND DEVICES THEREFORE issued to Desaraju V. Varaprasad, Niall R. Lynam, Hamid R. Habibi and Padma Desaraju. The liquid crystal elements and the electrochemichromic elements are fluid-like at room temperature but greatly increase in viscosity and can even solidify at very low temperatures with a consequent decrease in performance. Accordingly, heating means are often provided for such elements when used in vehicle rearview mirror systems, such as disclosed in U.S. Pat. No. 4,584,461 for a PLANAR HEATER FOR LIQUID CRYSTAL ELEMENT, issued to Toru Teshima et al. The all solid-state electrochromic element stands in contrast to the liquid crystal and electrochemichromic elements in that it utilizes multiple layers of inorganic metal oxide thin films deposited on a transparent substrate rather than a solvent-based liquid solution. Thus all layers are solid at all temperatures. However, cold climate operation is still a problem in that the electrochromic performance (the depth of dimming achieved, the speed of coloration and/or bleach, etc.) can be detrimentally effected at low temperatures. In this regard, all solid-state electrochromic mirrors have a particular disadvantage in that ion and electron conduction and transport through the thin films, important to the electrochromic coloration and/or bleaching, is particularly slowed at low temperatures (below ambient in general and 5° C. or thereabouts in particular). The net effect is that, at low temperatures, these solid-state electrochromic devices are significantly slowed and, if temperature gradients exist across the mirror surface, uneven coloration and/or bleaching can be seen. Such effects are consumer undesirable and detract from the glare protection performance of the units.

SUMMARY OF THE INVENTION

According to the invention, means are provided to heat the electrochromic stack so that the electrochromic performance expected by the driver during normal temperature (20° C. or thereabouts) operation can be delivered when the mirrors are operated at low temperatures. Moreover, this heating is very uniformly distributed across the entire electrochromically-active mirror surface so that there are no thermal gradients and so that the coloration/bleaching of the mirror device is uniform. The need for truly uniform heating means, and the difficulty to so provide, grows as the size of the mirror increases and is particularly difficult for large area mirrors such as truck mirrors used on Class 8 vehicles and the like.

In a rearview mirror system having an electronically controlled element such as an all solid-state electrochromic reflective element with a continuously variable reflectance surface, perceived quality requires that the reflective element color to a uniform reflectance level over the entire surface. Furthermore, drive circuit means, particularly those that operate as an open loop control system, without obtaining feedback by sensing glare-producing light after it has passed through the electrochromic element, produce a drive signal having a value that establishes the reflectivity of the reflective element at a given level, as a function of the ambient light and the glare experienced by the driver. It is desirable that, for a given value of the drive signal, the reflective element uniformly colors to a given reflectivity level.

According to one aspect of the invention, a rearview mirror having an all solid-state electrochromic reflective element includes drive circuit means for supplying a signal to the reflective element in order to color the reflective element to establish its reflectance level. Heating means are provided for very uniformly heating substantially the entire surface of the reflective element in order to promote uniform coloration of the surface to a given reflectance level for a given level of the drive signal.

According to another aspect of the invention, a reflective element having a continuously variable reflectance surface is provided with drive circuit means for supplying a signal to the reflective element in order to establish its reflectance level. A heater is provided in heat transfer association with the reflective element in order to supply heat to the reflective element when the heater is energized. Circuit means are provided for selectively applying energy to the heater, the circuit means being responsive to an ambient light level indicator in order to apply energy to the heater during low ambient light conditions and at low temperatures. In this manner, the reflective element is heated in cold climates when the ambient light conditions indicate that the mirror is likely to be colored to a lower reflectance level to reduce the amount of glare reflected to the driver's eyes.

According to yet another aspect of the invention, the heating means for supplying heat to the reflectance surface includes first means for applying heat evenly distributed across substantially the entire reflectance surface and second means for applying heat to the reflectance surface at a higher rate than the first means. In this manner, heater control means may actuate the first means when needed to enhance the coloration of the reflective element to an even, accurate reflectance level. When de-icing of the reflective element is necessary, the heater control means actuates the second means to apply heat at a higher rate to quickly melt accumulated ice.

Accordingly, the invention provides very uniform heating of continuously variable reflectance elements, and in particular all-solid-state electrochromic mirrors. The invention additionally provides very uniform heating to continuously variable reflectance elements in a manner that is practical and commercially viable, particularly for large area reflectance elements, such as those used for truck mirrors. The invention further provides control circuitry adapted to meeting the particular needs of electronically dimming rearview mirror systems.

These and other objects, advantages and features of this invention will become apparent upon review of the following specification in conjunction with the drawings.

DESCRIPTION OF THE PREFERRED EMBODIMENT

Figure 1:
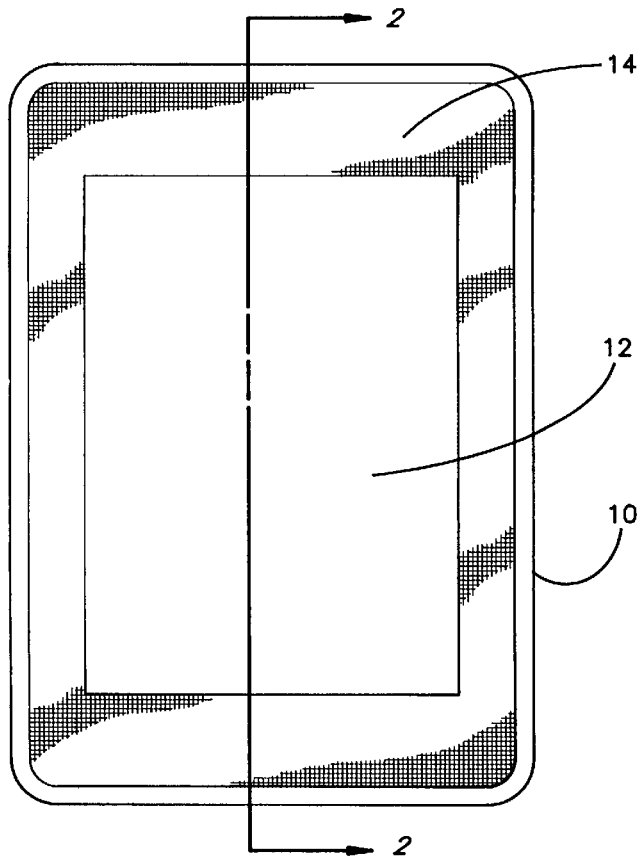
FIG. 1 is a rear elevation of a mirror system according to the invention.

Referring now specifically to the drawings, and the illustrative embodiments depicted therein, a mirror system has an electrochromic reflective element 10 that includes a heater pad 12 and heat distribution pad 14 for distributing heat from heater pad 12 uniformly across the reflective surface of reflective element 10 (FIG. 1). When heater pad 12 is supplied with energy, its heat output is evenly distributed across the entire mirror area, even to the outer extremities, by heat distribution pad 14. Heat distribution pad 14 is preferably a high-conductivity metal, such an aluminum foil or copper foil of thickness greater than 10 mils. In the illustrative embodiment, heat distribution pad 14 is an 11 mil. aluminum sheet with an adhesive layer, which is commercially available from 3M Products, Inc. Heater pad 12 is a resistance heater having a positive temperature coefficient in order to maintain electrochromic reflective element 10 at a relatively constant temperature, whenever heater pad 12 is energized.

Figure 2:
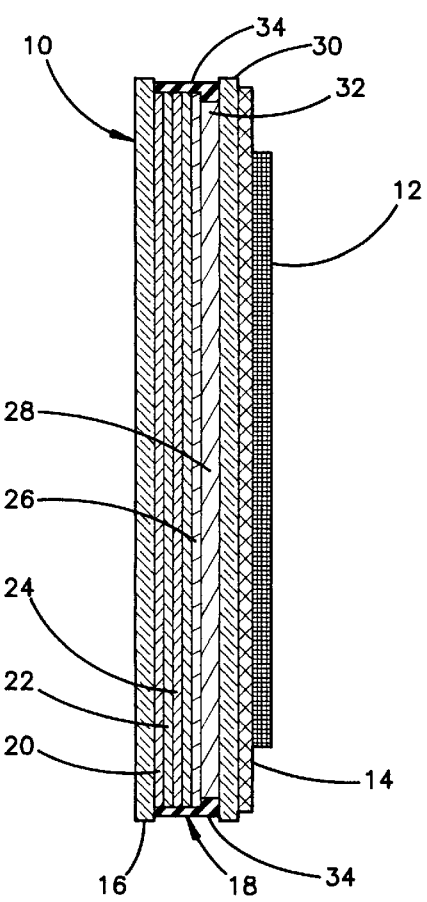
FIG. 2 is a cross-section taken along the lines II—II in FIG. 1.
Figure 3:
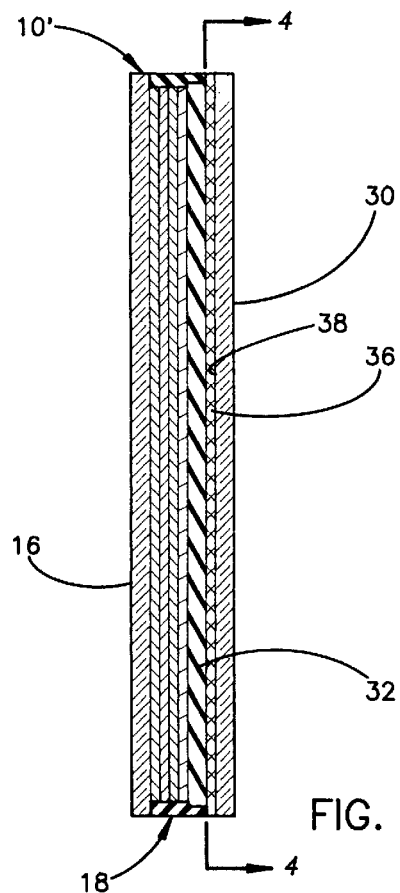
FIG. 3 is the same view as FIG. 2, of an alternative embodiment.

Electrochromic reflective element 10 is an all solid-state electrochromic device of the type disclosed in commonly-owned U.S. Pat. No. 4,712,879, issued to Niall R. Lynam for an ELECTROCHROMIC MIRROR, the disclosure of which is hereby incorporated herein by reference. Electrochromic reflective element 10 includes a transparent front glass plate 16, or similar substrate, upon which a multiple-layer stack of inorganic metal oxide films, generally shown at 18, are deposited (FIG. 2). This stack includes a first layer 20 of indium tin oxide, deposited to a thickness of 1500 angstrom units. Next is a layer 22 of NiO deposited to a thickness of 450 angstrom units, followed by a layer 24 of $Ta_2O_5$, deposited to a thickness of 1200 angstrom units. This is followed by a layer 26 of $WO_3$ deposited to a thickness of 800 angstrom units and a reflective layer 28 of aluminum deposited to a thickness of 1000 angstrom units. Electrochromic reflective element 10 further includes a rear glass plate 30, or similar substrate, which is bonded to the film stack 18 by a layer 32 of insulating interlayer, such as polyvinylbutyral (PVB). This assembly is sealed by a perimeter layer 34 of epoxy applied to reflective element 10 by a silk screening process.

A preferred, alternative electrochromic reflective element 10' includes a resistance layer, or heating film, 36 deposited on an inwardly facing surface 38 of rear glass plate 30. Resistance layer 36 may be a metal thin-film, or a thick film of graphite or a polymer doped with a resistive means, such a graphite. In the illustrated embodiment, resistance layer 36 is a vacuum-deposited thin-film of titanium, inconel, chromium, stainless steel or hastelloy, or similar material of sheet resistance of $1\times10^{-5}$ ohm cm. to $1\times10^{-4}$ ohm cm. or thereabouts deposited to a thickness to provide sheet resistance of 0.2 to 20 ohms/square or thereabouts. In order to achieve this sheet resistance, the particular metal will be deposited to a thickness of between 500 and 5000 angstrom units. The specific resistivity value is selected as a function of the power dissipation required, the voltage to be applied, the aspect ratio geometry of the reflective element and the buss bar layout. In the illustrated embodiment, resistance layer 36 is selected in order to dissipate power in the range of 1.0 to 1.5 watts per square inch of active electrochromic reflective area.

Resistance layer 36 is deposited on the inward facing surface 38 of rear glass plate 21 in order to isolate the layer from the outside environment. Thus, the dangers of short circuits and corrosion of the metal layer are minimized. Interlayer layer 32, in addition to encapsulating the stack of inorganic films 18 and the resistance layer 36, additionally serve as a safety/antiscatter layer and an electrical insulation between resistance layer 36 and the stack of inorganic films 18. Alternatively, heater pad 12 and heat distribution pad 14 (FIG. 2) could also be located on the inward facing surface of rear glass plate 30.

Figure 4:
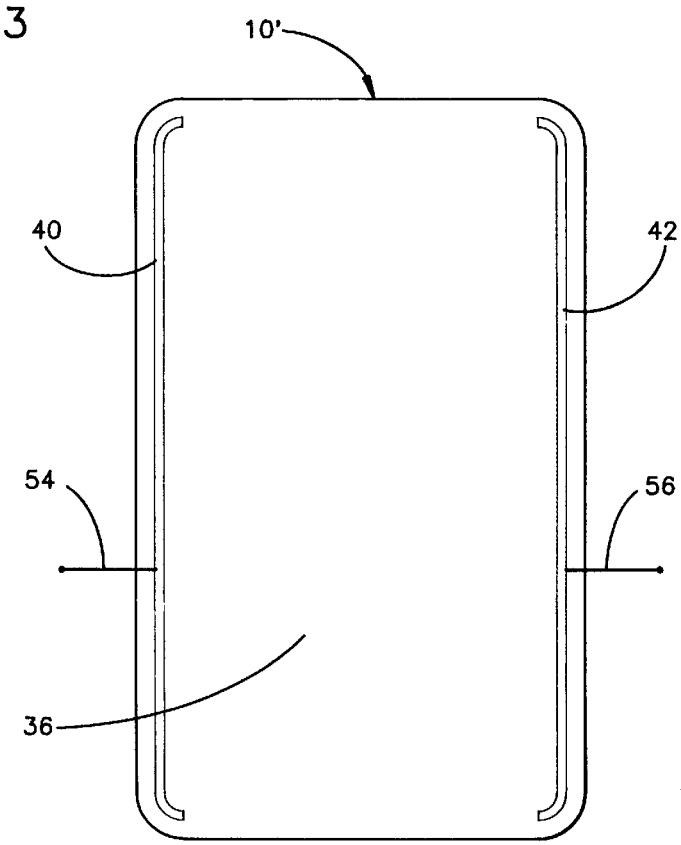
FIG. 4 is a cross-section taken along the line IV—IV in FIG. 3.

Electrochromic reflective element 10' additionally includes buss bars 40 and 42 along opposite vertical perimeter edge portions, with electrical interconnection terminals 54, 56 provided in order to supply electrical energy to heating film 36 (FIG. 4). Buss bars 40 and 42 are applied to heating film 36 using ultrasonically-assisted soldering with CERASOLZER solder, manufactured by The Asahi Glass Company. However, buss bars 40 and 42 may be provided by silver frit or by a metal ribbon connector crimped along the edges of resistance layer 36, both techniques being well known in the art.

Electrochromic reflective element 10 may be produced by depositing resistance layer 36 upon a large sheet of rear glass plate 30 and subsequently cutting the rear glass plate from the larger coated sheet of glass. This technique has the advantage of utilizing in-line coaters commonly used for coating architectural windows and avoids over-spray along the cut glass edges. Over-spray potentially exposes resistance layer 36 to contact from the exterior, which is potentially hazardous and detrimental to the successful operation of the reflective element 10.

Figure 5:
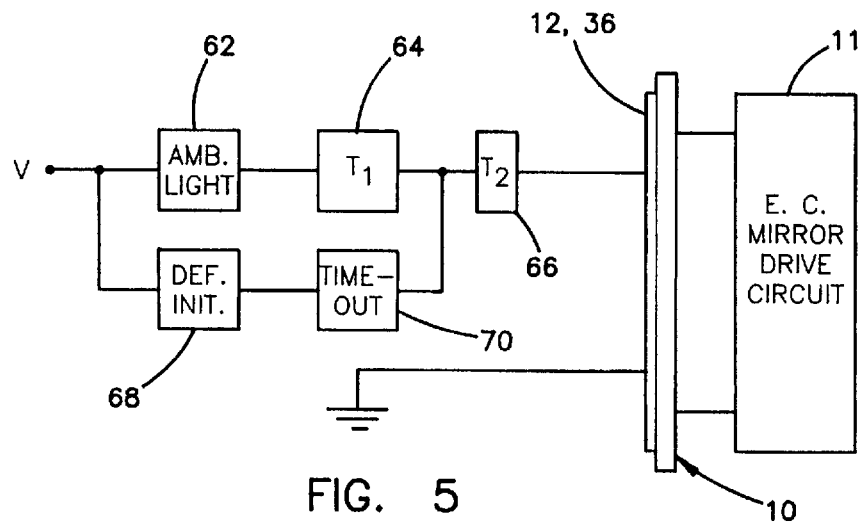
FIG. 5 is a block diagram of an electrical control circuit according to the invention.

In order to control the application of energy to heater pad 12 or resistance layer 36, a control circuit 59 is provided (FIG. 5). Control circuit 59 includes an ambient light indicating means 62 which indicates that a low ambient light condition exists. Indicating means 62 is connected from a voltage source V in series with a first temperature responsive switch means ($T_1$) 64, which is closed, or conducting, whenever the ambient temperature is below a predetermined temperature, such as 15° C.–20° C. and a second temperature responsive means ($T_2$) 66, which is closed whenever the ambient temperature is below a second, higher level, such as 60° C. In this manner, energizing voltage V is applied to heater pad 12, or resistance film 36, whenever indicating means 62 indicates that a low ambient light condition exists and temperature sensor 64 indicates that the temperature is below 15° C.–20° C. Temperature sensor 64 is provided for the purpose of energizing heater pad 12 or resistance layer 36 only when the ambient temperature is below a level that may produce color gradients in electrochromic reflective element 10, or cause element 10 to provide an erroneous reflectance level from that established by an electrochromic element drive circuit 11, such as that disclosed in commonly owned U.S. Pat. No. 4,793,690, issued to Edward A. Gahan, Keith W. Molyneux and Kenneth Schofield for a REAR-VIEW MIRROR CONTROL CIRCUIT. Note that if the heater pad 12 is of the positive temperature coefficient type described in U.S. Pat. No. 4,882,466 to Friel et al., the overtemperature protection provided by temperature sensor 66 can optionally be dispensed with.

Control circuit 60 additionally includes a conventional defrost initiate means 68 which may be a manually actuatable switch, or a temperature sensor, or a combination of the both, in order to indicate the desirability of energizing heater pad 12 or resistance layer 36 in order to de-ice reflective element 10. As is conventional, defrost initiate means 68 is combined with a time out circuit 70 to remove power from heater pad 12 or resistance layer 36 after a predetermined period of time following the initiation of defrosting by actuation of means 68. Overload temperature sensor 66 will disconnect voltage source V from reflective element 10 if the temperature of reflectance element 10 exceeds set point $T_2$, which is typically 60° C.

Control circuit 60 is responsive to conditions when the drive circuitry for electrochromic reflective element 10 is active, provided that the mirror temperature is below a given level that will have a tendency to affect the rate and degree of coloration of the reflective element. Because glare is usually not a problem during daylight, or high ambient light levels, the glare protection of the electrochromic reflective element is usually inactive or dormant. Thus, control circuit 60 eliminates unnecessary expenditure of electrical energy to activate the heating means by day. Ambient light indicating means 62 may be provided in many different manners, the particular manner being a function of the type of drive circuit 11 utilized to determine the reflectant level of reflective element 10. Accordingly, if the drive circuit for the reflective element has a manual on/off switch, ambient light indicating means 62 may be made responsive to such switch because the driver will typically energize the drive circuit only when it is desired to lower the reflectance level of the mirror, which typically is during low ambient conditions. Alternatively, ambient light indicating means 62 may be made responsive to the headlight-actuating switch for the vehicle which, typically, is usually actuated during low ambient light conditions. Use of circuit 60 in such a mode allows the driver to turn on the headlights during daylight while highway driving without wastefully energizing the heater pad 12. However, ambient light indicating means 62 may be a separate ambient light sensing means which is responsive to the level of ambient light being below a predetermined level. Such light sensing means are well known in the art, and may include a separate sensor or an ambient light sensor that is part of the drive circuitry of a fully-automated glare reducing interior rearview mirror or part of a twilight sentinel. A separate ambient light sensor may be mounted on the exterior, or interior, portion of the vehicle and may be shielded in order to respond to variations in ambient light conditions external of the vehicle or internal to the vehicle. Such shielding techniques are well known in the art.

Figure 6:
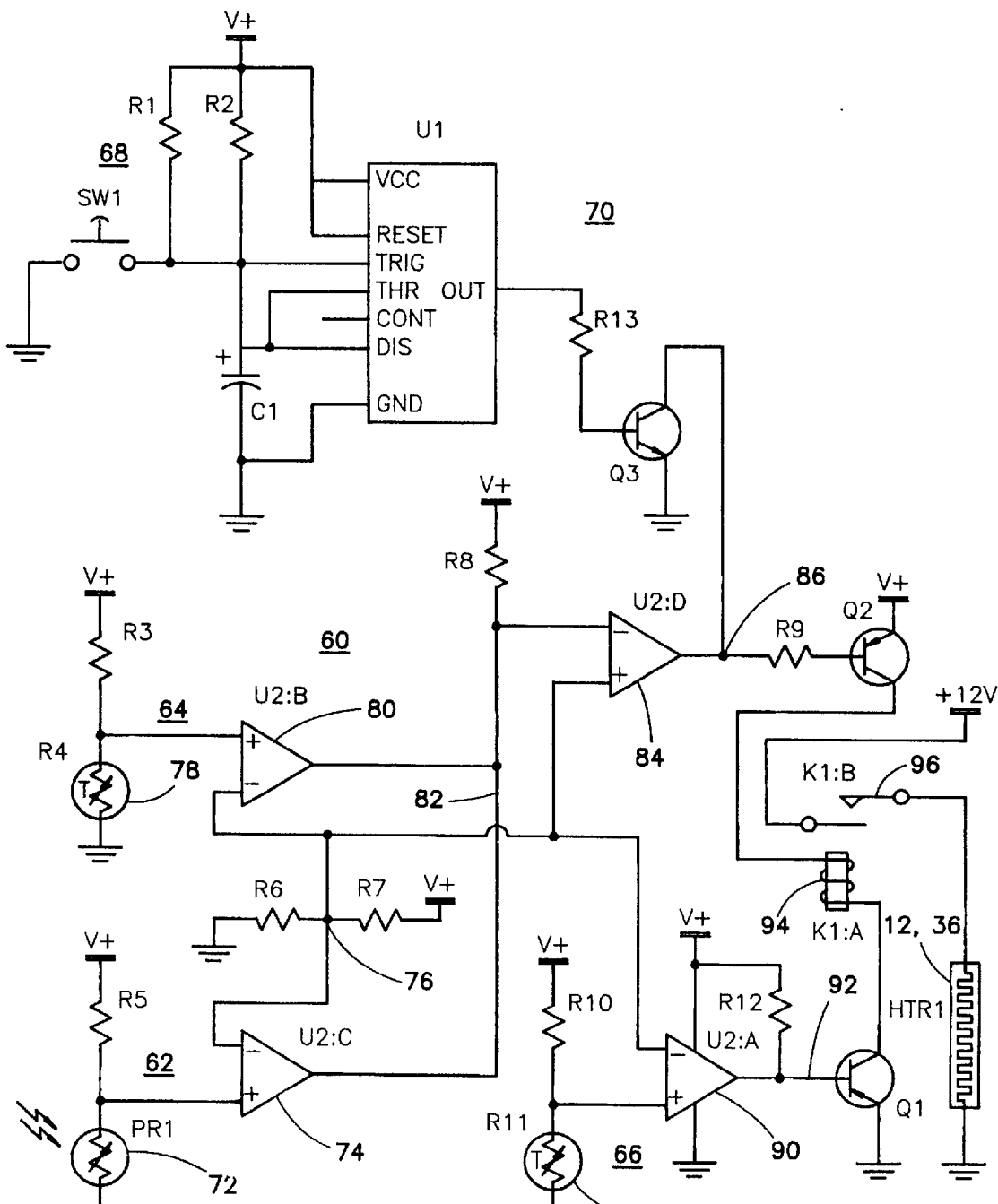
FIG. 6 is a schematic diagram of the electrical control circuit in FIG. 5.

Control circuit 60, as illustrated in FIG. 6, may include a low ambient light sensor 72 connected in a voltage divider with a resistor R5 and applied to the non-inverting input of a comparator 74, whose inverting input is connected to a fixed reference voltage 76 established by a voltage divider including resistors R6 and R7. Control circuit 60 may additionally include a low temperature sensor 78 connected in a voltage divider with a resistor R3 and applied to the non-inverting input of a comparator 80, whose inverting input is connected with reference voltage 76. The outputs of comparitors 74 and 80 are connected together at junction 82, which is connected to a pull-up resistor R8 and applied to the inverting input of a comparator 84. The non-inverting input of comparator 84 is connected with reference voltage 76 and its output 86 is connected to the collector of a transistor Q3, and through a resistor R9, to the base of a transistor Q2.

Control circuit 60 additionally includes a high temperature sensor 88 connected in a voltage divider with a resistor R10 and applied to the non-inverting input of a comparator 90, whose inverting input is connected with reference voltage 76. An output 92 of comparator 90 is connected to a pull-up resistor R12 and is applied to the base of a transistor Q1. The emitter-collector junctions of transistors Q1 and Q2 are connected in a series circuit between voltage source V and ground in series with a coil 94 of a relay K1. The normally-open contacts 96 of relay K1 are connected between the vehicles battery voltage plugs (+12V) and heating means 12, 36. Control circuit 60 additionally includes a manually actuatable switch SW1 connected to a pull-up resistor R1 and is applied to the trigger input of a monostable multivibrator U1. The output of multivibrator U1 is connected through a resistor R13 to the base of transistor Q3.

In operation, when the level of ambient light sensed by light sensor 72 decreases below a level determined by the voltage at reference 76 and the value of resistor R5, the output of comparator 74 switches from ground to a floating condition. If the ambient temperature, as sensed by sensor 78, is below a predetermined level, such as 15° C.–20° C. as established by the level of reference 76 and the value of resistor R3, the output of comparator 80 will additionally switch to a floating condition. If the output of both comparitors 74 and 80 are floating, resistor R8 will pull line 82 high, which will cause output 86 of comparator 84 to be pulled low. If the output 92 of comparator 90 is in a high state, which will occur as long as the temperature sensed by overtemperature sensor 88 is below the set point established by reference voltage 76 and resistor R10, transistors Q1 and Q2 will conduct a current through the coil 94 of relay K1, thus energizing heating means 12, 36. If the ambient light sensed by sensor 72 or the temperature sensed by temperature sensor 78 increases above their respective set points, the associated comparator will switch line 82 to a low state which will cause output of comparator 84 to float. This will turn off transistor Q2 and open contacts 96 of relay K1 to de-energize heating means 12, 36. Likewise, if the temperature sensed by overtemperature sensor 88 increases above its respective set point, output 92 of comparator 90 will be switched low which will cause transistor Q1 to cease conducting and de-energize relay K1.

When switch SW1 is manually closed by an operator desiring to remove frost or dew from reflective element 10, the output of monostable multivibrator U1 switches high which turns on transistor Q3 which pulls output 86 to a low state. This causes transistor Q2 to conduct and, as long as the ambient temperature sensed by overtemperature sensor 88 is below its respective set point, transistor Q1 will additionally be conducting which will cause coil 94 of relay K1 to close switch 96 and energize heating means 12, 36. At the end of the timed period for monostable multivibrator 70 established by resistor R2 and capacitor C1 at several minutes, its output switches to a low state which turns transistor Q3 off. This allows output 86 to float provided that comparator 84 is not pulling it low, which causes transistor Q2 to cease conducting, which de-energizes heating means 12, 36.

Figure 7:
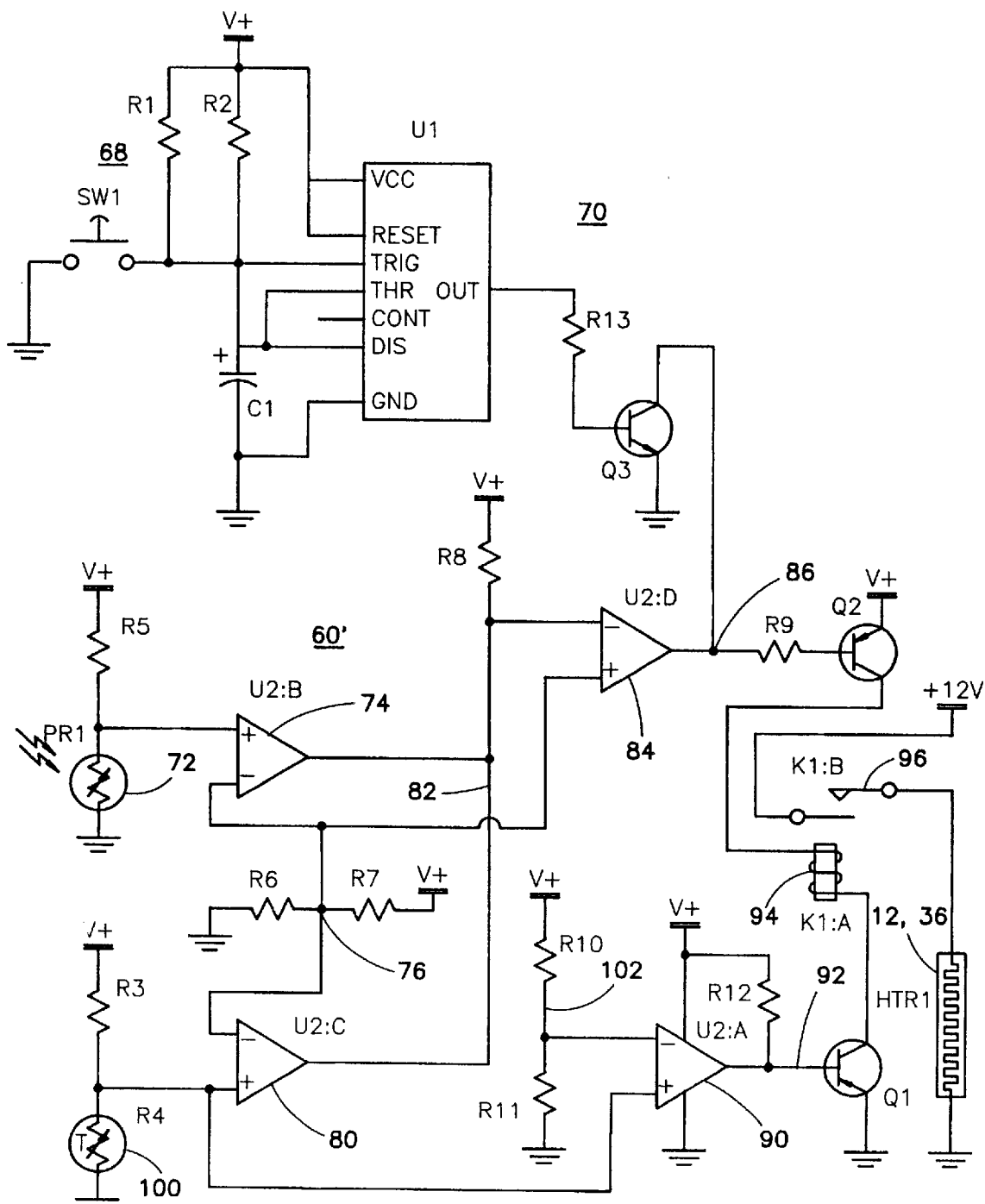
FIG. 7 is a schematic diagram of an alternative embodiment of an electrical control circuit.

Control circuit 60' performs the same functions as control circuit 60 except that a single temperature sensor 100 performs the functions performed by sensors 78 and 88 in circuit 60 (FIG. 7). This is accomplished by providing a set point voltage 102, by a voltage divider defined by resistors R10 and R11, for comparator 90 that is separate from the set point 76 established for comparator 80. Therefore, if the temperature sensed by temperature sensor 100 is below the set point established by reference 76, the output of comparator 80 will be floating and, if the output of comparator 74 is also floating in response to a low ambient light condition, the output of comparator 84 will be low which causes transistor Q2 to be conducting. Because the set point established for comparator 80 is necessarily lower than that established for comparator 90, the output of comparator 90 will be high, which will cause transistor Q1 to be conducting. Therefore, relay K1 will be energized in order to apply power to heating means 12, 36. If the temperature sensed by temperature sensor 100 is above the set point for comparator 80 but below the set point for comparator 90, the output of comparator 80 will pull line 82 low which will cause the output of comparator 84 to float. Therefore, unless output 86 is pulled low by transistor Q3, transistor Q2 will be non-conducting and heating means 12, 36 will be deenergized. If, however, Q3 is conducting because of the recent actuation of switch S1, output 86 will be pulled low, energizing transistor Q2. This will energize heating means 12, 36 unless the temperature sensed by temperature sensor 100 is greater than the set point of comparator 90, as established by voltage reference 102. If the temperature exceeds this set point, then output 92 of comparator 90 will switch low which will cause transistor Q1 to be non-conducting, which will de-energize relay K1. irrespective of the state of transistor Q2.

A resistance layer, or heater film, may be used with its own control circuitry and be provided with a separate heating pad 12 used for performing the defrosting function. This would allow optimized design of each heating means for its specialized function. The defrosting heating pad would be designed for rapid defrosting, particularly in the central region of the reflective element, and would typically carry a relatively large current for a short period. The resistance layer would provide heating of the entire reflective surface with a lesser current but with greater uniformity over the entire active surface of the reflective element and for a longer period of time.

Figure 8:
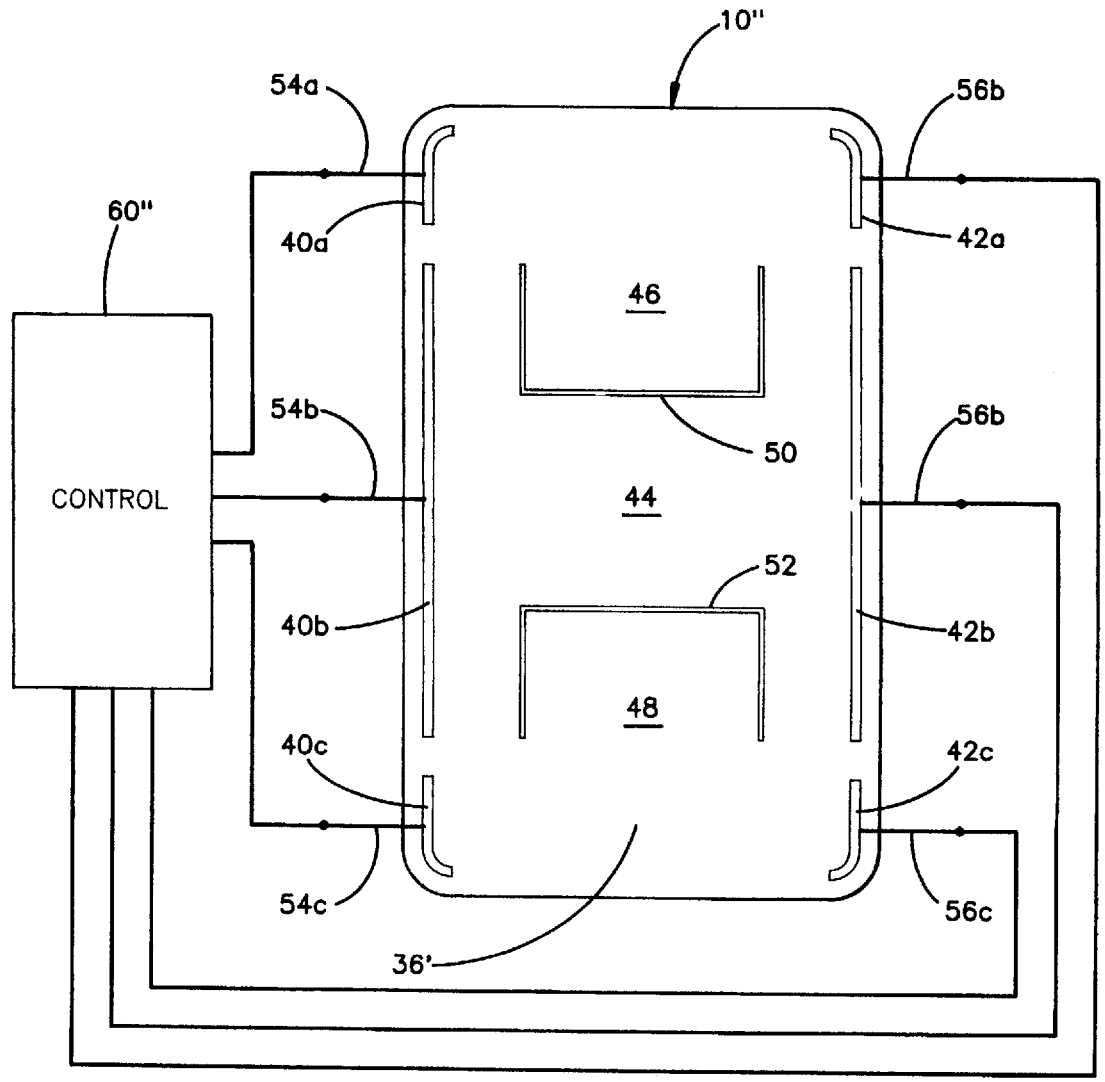
FIG. 8 is an elevation view of a heating film illustrating an alternative embodiment.

Such specialized de-icing function, in which localized heat is desired at a high level, and uniform coloration function in which uniform heating of the entire active surface of the reflective element at a lesser level, may be provided in an electrochromic reflective element 10" having a specially configured heating film 36" (FIG. 8). Heating film 36" includes buss bar sets 40a, 40b and 40c along one vertically extending edge portion of heating film, resistance layer, 36' and set 42a, 42b and 42c along right side portion of resistance layer 36'. Resistance layer 36' includes a central portion 44 located generally between buss bar segments 40b and 42b, a top portion 46 located generally between buss bar segments 40a and 42a and a lower portion 48 located generally between buss bar segments 40c and 42c. A U-shaped insulating break 50 in resistance layer 36' generally separates portion 46 from portion 44 and an oppositely facing U-shaped insulating break 52 generally separates portion 48 from portion 44. Buss bar segments 40a, 40b and 40c are connected with a control circuit 60" by terminals 54a, 54b and 54c respectively. Buss bar segments 42a, 42b and 42c are connected with control circuit 60" by terminals 56a, 56b and 56c respectively.

With resistance layer 36' segmented in the manner illustrated in FIG. 8, electrochromic reflective element 10" is capable of being heated rapidly in a more localized manner for the purpose of defrosting the reflective element and in a more uniform, but less concentrated, manner for the purposes of maintaining uniform temperature in order to control the coloration of the reflective element. In order to defrost reflective element 10", a voltage V is applied across terminals 54b, 56b alone. Because insulating breaks 50 and 52 partially separate portions 46 and 48 from middle portion 44 of the resistance layer, a greater current density will be generated in central portion 44 than in either upper or lower portions 46, 48. Furthermore, the power generated by resistance layer 36' will be relatively high because the resistance between terminals 54b and 56b will be relatively low, increasing the $I^2R$ heating of reflective element of 10". When it is desired to maintain a uniform heating of reflective element 10", terminals 54a, 54b and 54c are shorted together and terminals 56a, 56b and 56c are shorted together with voltage V applied across terminals 54a, 54b, 54c and terminals 56a, 56b, 56c. Because the voltage gradient is applied across the entire resistance layer 36', the heat generated by layer 36' is uniform across the entire reflective element 10". The aspect ratio geometry of resistance layer 36' provides that the resistance between shorted terminals 54a, 54b, 54c and 56a, 56b, 56c is greater than that between 54b and 56b alone. The reason is that, the resistance film is inversely proportional to the "squareness" of the surface, not its total size. Therefore, the "more square" central portion 44 has a lower resistance than the "less square" overall layer 36' having portions 44, 46 and 48. Therefore, a lower current density, and hence $I^2R$, will be provided when voltage V is applied across the entire layer 36'.

Other alternatives are possible. If a transparent conductor like ITO is used for resistance layer 36, the layer could be deposited on the front surface of the front glass plate 16.

However, there are drawbacks to this approach, including the cost of the transparent film and the exposure of the heated film to the elements where wind-losses reduce efficiency and road salt may cause damage over time.

The present invention recognizes the need of providing uniform heat distribution for electrochromic mirrors, and particularly for all solid-state reflective elements. This is accomplished in a manner that recognizes that the traditional de-icing function of the mirror may be desired at times when the glare protection of the electrochromic reflective element is not desired, and vice versa. For example, by day, many drivers may desire to de-ice the mirror. Once the ice build up has been removed, the driver usually does not want to have the defrosting mirror continually heated and, with the ice gone, now wastefully draining the automobile power system. Likewise, at night and at low but not necessarily freezing temperature, 5° C. for example, it is desirable to have the uniform heat distribution means operate but operation of the defrosting means is not needed.

The heating requirements recognized by the present invention for solid-state electrochromic mirrors and equivalent devices are not well met by the prior art defrosting means for mirrors. Even when ice has not built up on the mirror, the ambient temperature may be sufficiently low to produce an erroneous level of coloration of the reflective element. Also, whereas ice can build up during any time of day or night, glare principally occurs at night. In the situation where the invention is utilized with a manually-operated mirror system that allows the driver control over the reflectance level of the mirror, the driver benefits from independent control over both the de-icing function and the electrochromic function as it relates to the reflectance level of the reflective element. By using the circuitry of this invention, the heating means requirements are automatically activated whenever a low ambient and low temperature condition simultaneously exist Thus the driver is spared the confusion of deciding when heating of the electrochromic element is required. Also, the circuitry ensures that, by day when ambient light levels are high, the electrochromic heating means are not wastefully activated. On occasions when the driver simultaneously desires a defrosting function and heating for uniform coloration, the driver will benefit from both of these function being operated concurrently in a manner that is convenient to the driver and that reduces the number of inputs. Accordingly, the heating function associated with the reflectance level is automatically operated in cold climates by night under conditions that may cause distortion in the reflectance level of the mirror.

The circuits and concepts of this invention are readily applicable to a wide variety of rearview mirror systems. For example, in a vehicle such as a convertible where all three rearview mirrors (the interior mirror and driver- and passenger-side exterior mirrors) are potentially exposed to the outside climate, all three mirrors can be controlled by a single control unit such as described in FIGS. 5, 6 and 7 herein.

Other changes and modifications in the specifically described embodiments can be carried out without departing from the principles of the invention which is intended to be limited only by the scope of the appended claims, as interpreted according to the principles of patent law, including the Doctrine of Equivalents.

We claim:

1. An exterior rearview mirror having a manually activated heating system suitable for use on a vehicle comprising:

an electrochromic reflective element having an electrochromically active area, said electrochromic reflective element including a first glass plate having a front and rear surface, said rear surface of said first glass plate coated with a transparent conductor, a second glass plate having a front and rear surface, and an electrochromic medium and a metal reflective layer disposed between the rear surface of said first glass plate and the front surface of said second glass plate, said electrochromic medium being between said transparent conductor and said metal reflective layer;

said front surface of said first glass plate being subject to frosting when exposed to an outdoor environment at a temperature of 0° C. or lower;

electrical means to achieve an electrochromic function for supplying a signal to said reflective element between said transparent conductor and said metal reflective layer in order to establish the reflectance level of said reflective element;

heating means to achieve a defrosting function on said rear surface of said second glass plate wherein said heating means is hidden from view by said metal reflective layer, said heating means heating said second glass plate in order to enhance coloration and bleaching of said electrochromic reflective element during low temperature operation and to defrost said front surface of said first glass plate, wherein said heating means includes one of a positive temperature coefficient material, a metal layer, and a transparent conductor layer;

said heating means being electrically insulated by said second glass plate from said electrochromic medium and said metal reflective layer; and manually activated control means for applying energy in the form of direct current from an automobile power system to said heating means wherein said control means includes a defrost initiate means that is manually actuated when frost is present on said front surface of said first glass plate.

2. The exterior rearview mirror in claim 1 wherein said transparent conductor comprises indium tin oxide.

3. The exterior rearview mirror in claim 1 wherein said metal reflective layer comprises aluminum.

4. The exterior rearview mirror of claim 1 wherein said heating means comprises a positive temperature coefficient material.

5. The exterior rearview mirror of claim 4 wherein said electrochromic medium comprises an electrochemichromic medium.

6. The exterior rearview mirror of claim 4 wherein said positive temperature coefficient material comprises a positive temperature coefficient heater pad.

7. The exterior rearview mirror of claim 4 wherein said heating means further comprises a heat distribution means for distributing heat across the surface of said second surface of said second glass plate, said heat distribution means being disposed between said second surface and said positive temperature coefficient material.

8. The exterior rearview mirror of claim 7 wherein said heat distribution means comprises a metal foil.

9. The exterior rearview mirror of claim 8 wherein said foil is an aluminum foil.

10. The exterior rearview mirror of claim 1 wherein said heating means preferentially heats a central portion of said electrochromically active area in order to promote rapid defrosting of said front surface of said first glass plate.

11. The exterior rearview mirror of claim 1 wherein said heating means comprises a metal layer.

12. The exterior rearview mirror of claim 11 wherein said metal layer is selected from the group consisting of titanium, an inconel, a chromium, a stainless steel, and a hastelloy layer.

13. The exterior rearview mirror of claim 11 wherein said metal layer is vacuum-deposited on said surface of said second glass plate.

14. The exterior rearview mirror of claim 1 wherein said electrochromic medium comprises an electrochemichromic medium.

15. The exterior rearview mirror system of claim 14 wherein said heating means comprises a positive temperature coefficient material.

16. The exterior rearview mirror system in claim 15 wherein said positive temperature coefficient material comprises a positive temperature coefficient heater pad.

* * * * *